US007885903B2

(12) United States Patent
Mayer et al.

(10) Patent No.: US 7,885,903 B2

(45) Date of Patent: Feb. 8, 2011

(54) METHOD AND DEVICE FOR GENERATION AND SALE OF FRANKINGS FOR SENDING MAIL

(75) Inventors: Boris Mayer, Bonn (DE); Thomas Ogilvie, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 11/658,636

(22) PCT Filed: Jun. 2, 2005

(86) PCT No.: PCT/EP2005/005946

§ 371 (c)(1), (2), (4) Date: Mar. 3, 2008

(87) PCT Pub. No.: WO2006/010397

PCT Pub. Date: Feb. 2, 2006

(65) Prior Publication Data

US 2008/0275826 A1 Nov. 6, 2008

(30) Foreign Application Priority Data

Jul. 26, 2004 (DE) ....................... 10 2004 036 191

(51) Int. Cl.
*G06F 17/00* (2006.01)
*G07B 17/02* (2006.01)

(52) U.S. Cl. ....................................................... 705/408

(58) Field of Classification Search .................. 705/408
See application file for complete search history.

(56) References Cited

U.S. PATENT DOCUMENTS

| | | | | |
|---|---|---|---|---|
| 6,336,053 | B1 * | 1/2002 | Beatty | 700/108 |
| 2002/0004760 | A1 * | 1/2002 | Yoshida et al. | 705/26 |
| 2002/0095379 | A1 * | 7/2002 | Likourezos et al. | 705/40 |
| 2002/0194472 | A1 * | 12/2002 | Lawson | 713/163 |
| 2004/0089482 | A1 * | 5/2004 | Ramsden et al. | 177/1 |

FOREIGN PATENT DOCUMENTS

| | | |
|---|---|---|
| DE | 38 08 616 | 9/1989 |
| DE | 197 37 232 | 3/1999 |
| DE | 199 25 194 | 12/2000 |
| DE | 201 21 302 | 2/2001 |
| EP | 1 178 440 | 2/2002 |
| WO | WO-00/31693 | 6/2000 |
| WO | WO-01/58603 | 8/2001 |
| WO | WO-02/063517 | 8/2002 |

OTHER PUBLICATIONS

Minahan, Tim. "New postal kiosk a step ahead of its old Buddy; USPS tests Unisys Corp,'s postage and mailing centers at five locations." Government Computer News, v13, n6, p. 16(1). Mar. 21, 1994.*

* cited by examiner

*Primary Examiner*—John W Hayes
*Assistant Examiner*—Allen J Jung
(74) *Attorney, Agent, or Firm*—Marshall, Gerstein & Borun LLP

(57) ABSTRACT

Method for generation and sale of frankings, which can be used for sending mail from a customer to a receiver. The frankings are thus preferably produced on an electronic mailbox, whereby the generation and the printing out can be carried out in a highly personalized manner by using stored customer data and receiver addresses entered by the customer concerned. In addition to personalized address input a franking comprises a unique identification code which can be used for franking security as well as transport control and monitoring.

9 Claims, 3 Drawing Sheets

METHOD AND DEVICE FOR GENERATION AND SALE OF FRANKINGS FOR SENDING MAIL

BACKGROUND OF THE INVENTION

1. Field of the Invention

The invention relates to a method for the generation and sale of postage payment labels at a device, whereby the postage payment labels can be used for sending all types of mailpieces (e.g. letters, parcels, goods) from a customer to a recipient.

The invention also relates to a device for the generation and sale of postage payment labels, whereby the postage payment labels can be used to send mailpieces from a customer to a recipient.

2. Related Technology

In addition to the use of locker compartment facilities for storing, for example, luggage or bank documents, the use of facilities specifically configured for delivering and picking up goods or mailpieces is known. Such electronic parcel deposit box facilities make it possible for a deliverer to deposit mailpieces into a lockable compartment of the facility, after which the recipient of the mailpiece is normally informed about the deposit. The recipient can then pick up the mailpiece from the facility at any desired point in time, for which purpose, for example, an individual access code is provided to him.

Electronic parcel deposit box facilities and associated methods have the advantage that, for the shipment to be delivered, the customer does not have to be present at his/her home address as is normally the case, but rather the shipment can be deposited in a parcel deposit box facility right away or else after an unsuccessful delivery attempt. Consequently, for instance, in case of an unsuccessful delivery attempt, no notification is left for the recipient indicating that he has to pick up the shipment during the fixed opening hours of a post office branch, but rather the parcel deposit box facility affords him an extra degree of flexibility.

Another advantage of electronic parcel deposit box facilities is that the facilities can also be used by a customer to drop off and send mailpieces. The mailpieces can be, for example, returned shipments, that are to be returned by the recipient via a transportation service provider. Another possibility is that this shipment is a mailpiece originating with a customer who deposits it into a parcel deposit box facility where it is picked up by a service provider and delivered to a recipient.

In order to implement a sending function in an electronic parcel deposit box facility, first and foremost, it is necessary to ensure correct payment transactions or payment verification for the mailpiece in question. In this context, the topic of automated payment transactions and payment verification is also of relevance for other drop-off modalities such as, for example, permanent locations operated by personnel (e.g. staffed post office branches).

For this purpose, it is a known procedure, for instance, similar to conventional locker compartment facilities, to employ a means for payment transactions such as cash slots or EC card readers or credit card readers at parcel deposit box facilities. It is also advantageous to use value labels such as stamps or other labels indicating a stored payment value which customers can apply onto mailpieces, thereby franking them. Such value labels are currently available to the customer, for example, in post office branches or via the Internet, and they are augmented by the customer with his sender's address and with the desired recipient address and then applied onto a mailpiece. A recording and verification of the value label can be carried out directly at the electronic parcel deposit box facility or in a device located downstream.

Various means are known for the acceptance of mailpieces and for the associated recording and control functions. For example, German utility model DE 201 21 302 U1 discloses a device for accepting parcels with a parcel sticker that is glued onto the parcel and that bears the address and the sender. The device comprises a deposit opening for placing the parcel onto a conveying means, integrated scales, opto-electronic devices for determining the parcel dimensions, a monitor and input means for implementing the dialog between a customer and the device. The device also has a money slot and a return change dispenser.

DE 38 08 616 A1 discloses, for example, a device for shipping packages, said device comprising a weight input means, a printer, a storage means, an input keyboard and a control device coupled thereto. The method for operating the device calls for the storage of several recipient addresses, mailing classes, postal code sections, form code sections and mailing rates, so that a user of the device can select the desired recipient data and a mailing class. On the basis of a table with the rates, a mailing rate is determined in conjunction with the weight of the mailpiece determined by the scales. The weight information can also be applied onto the mailpiece in the form of a barcode. The customer can select additional special services such as express or overnight delivery, which requires an additional fee. The device then enters the processed data into defined forms and prints these forms.

GENERAL DESCRIPTION OF THE INVENTION

The invention provides a method for the generation and sale of postage payment labels, whereby the postage payment labels can be used to send mailpieces from a customer to a recipient and the method allows the customer to purchase postage payment labels in a way that is simple and precisely tailored to the customer's requirements.

The invention also provides a device for executing the method.

a method Accordingly, the invention provides a method for the generation and sale of postage payment labels at a device, whereby the postage payment labels can be used for sending mailpieces from a customer to a recipient, comprising the following steps:

storing customer data of a customer in a storage means that is connected to a device, whereby the customer data contain at least the address of the customer;

storing several unique identification codes in the storage means that is connected to the device;

storing recipient address data that are associated with the customer in the storage means, whereby the recipient address data are generated by an Internet auction website, associated with the customer, and transmitted to the storage means;

recording the identification of the customer in a recorder of the device;

associating customer data with the customer on the basis of the identification in a processor that is connected to the device;

displaying the address of the customer on a display of the device for purposes of selection and/or modification by the customer;

displaying the recipient address data that are associated with the customer who is recorded at the device on the display for purposes of selection and/or modification by the customer;

determining the weight of the mailpiece;

assigning an identification code from the storage means and assigning the identification code with a postage payment label in the processor;

calculating the payment for the shipment of the mailpiece in the processor and displaying the payment to be made on the display;

paying for the postage payment label at payment means of the device; and, printing a postage payment label in a printer, whereby the postage payment label contains at least the assigned identification code, the address of the customer, and a recipient address.

The invention also provides a device for the generation and sale of postage payment labels, whereby the postage payment labels can be used to send mailpieces from a customer to a recipient, wherein the device comprises at least the following:

means to receive recipient address data associated with a customer from an Internet auction website;

storage means connected to the device for storing customer data and/or recipient address data associated with the customer and for storing several unique identification codes;

a recorder for recording the identification of a customer; a display for displaying the customer address and at least one recipient address to the customer;

means for selecting the customer address and a recipient address;

means for determining the weight of the mailpiece;

a processor that serves to associate customer data with the recorded customer, to calculate a payment for the shipment of the mailpiece on the basis of the determined weight, for assigning the identification code from the storage means and for assigning the customer address and a recipient address with a postage payment label;

payment means for effectuating the payment for a postage label; and, a printer for printing a postage payment label with the identification code, the customer address and the recipient address.

The method according to the invention for the generation and sale of postage payment labels at a device entails the fact that the postage payment labels can be used to send mailpieces from a customer to a recipient. The various steps of the method call for the storage of customer data of a customer in a storage means that is connected to the device, whereby the customer data contains at least the address of the customer. Moreover, several unique identification codes are stored in a storage means that is connected to the device. In this context, the storage means can be situated in the device or at a location that is physically remote from the device, whereby in the latter case, the storage means is connected to the device via a permanently or temporarily established line.

In a recorder of the device, the identification of a customer and the association of customer data with a customer are recorded on the basis of the identification in a processor that is connected to the device. The identification can be, for example, a customer card or the input of identification information such as codes. In a processor that is connected to the device, stored customer data is associated with the customer on the basis of the identification and the address of the customer is displayed to the customer on a display means of the device for purposes of selection and/or modification. Moreover, the weight of a mailpiece is determined. The weight can be specified, for example, through an entry by the customer or by placing the mailpiece onto a set of scales.

According to the invention, an identification code from the storage means is assigned and associated with a postage payment label in the processor. The payment for the shipment of the mailpiece is calculated in a processor that is connected to the device and the payment to be made is displayed on a display means of the device. The postage payment label is paid for at a payment means of the device, which can be effectuated, for example, by debiting an amount from an account, by inserting cash or by using money card or EC card functions. The method also encompasses the printout of a postage payment label in a printer, whereby the postage payment label contains at least the assigned identification code. If the customer has not selected a blank postage payment label, the postage payment label preferably also contains the address of the customer.

In an especially preferred embodiment of the invention, the method is augmented by additional steps comprising the storage of recipient address data that is associated with a customer in a storage means that is connected to the device. In addition to the customer's address, the recipient address data that is associated with the customer who is recorded at the device is also displayed on the display means of the device for purposes of selection. The customer can select a recipient address that is to be automatically printed in the recipient field of a postage payment label. The printer of the device prints a postage payment label, whereby the postage payment label can then also have a recipient address in addition to the assigned identification code and optionally also the customer address.

The stored recipient address data can be generated and transmitted to the storage means in various ways. In one embodiment of the invention, the addresses are generated by the customer and transmitted to the storage means. In another embodiment of the invention, the recipient address data is generated by an external component, associated with a customer and transmitted to the storage means. For example, the recipient address data can be generated by an Internet auction website, associated with a customer and transmitted to the storage means. Thus, the requisite recipient data for a transaction of an Internet auction website is automatically stored in the storage means and can be selected by the customer for printout on a postage payment label.

In an advantageous embodiment of the invention, the device generates and issues a receipt for the sold postage payment label. The receipt can contain, for example, information about the location of the device used for the purchase, the purchase date, the maximum permissible weight, the amount and/or the assigned identification code.

It has proven to be especially advantageous for the device for the generation and sale of a postage payment label to be an electronic parcel deposit box facility that has at least one lockable compartment for depositing and removing a mailpiece. In such an embodiment, in addition to functions for receiving and dispensing mailpieces, the parcel deposit box facility has means for transacting the sale of a postage payment label. As an alternative, however, the sale of parcel postage payment labels at a vending machine that is not a parcel deposit box facility is also conceivable.

In another especially preferred embodiment of the invention, the identification code in the storage means is characterized by at least two status displays 1 and 2, the status display 1 indicating that a postage payment label with an identification code has been printed out and the status display 2 indicating that no postage payment label has been printed out with an identification code. The status display of an identification code in the storage means is advantageously set to 2 at the beginning of the process and is set to 1 after the device has issued a postage payment label with the identification code.

The invention also relates to a device for the generation and sale of postage payment labels, whereby the postage payment labels can be used for sending mailpieces from a customer to a recipient. The device also has at least one storage means that is connected to the device for storing customer data and/or recipient address data that is associated with a customer and for storing several unique identification codes.

The device also includes a recorder for recording an identification of a customer, a display means for displaying information to a customer and a means for determining the weight of a mailpiece. Moreover, the device has a processor that serves to associate customer data with a recorded customer, to calculate a payment for the shipment of a mailpiece on the basis of the determined weight and for associating an identification code from the storage means with a postage payment label. Other means of the device are payment means for effectuating the payment for a postage label and printer for printing a postage payment label.

In an especially preferred embodiment of the invention, the device is an electronic parcel deposit box facility that has at least one lockable compartment for depositing and removing mailpieces. The storage means is situated in the device or at a location that is physically remote from the device and can be connected to it.

The method according to the invention and the appertaining device have various advantages for the generation and sale of postage payment labels. For instance, in a simple manner, postage payment labels can be generated and sold that are precisely tailored to the customer requirements since he can choose how much stored data and which items of stored data are to be automatically incorporated into the printout of a given postage payment label. Here, the customer can also dispense with the printout of stored data and can purchase a blank postage payment label. If he wishes to insert certain data, he can select it and modify it via a display, as a result of which there is no need for the complicated entry of his sender address and/or the recipient address, for example, using a keyboard since his personal recipient address book can be made available to him.

In addition to increased convenience for the customer, the method also entails the advantage that typing errors during the input of addresses can be avoided and the sender addresses as well as the recipient addresses can be more successfully read since they are printed rather than handwritten. This especially facilitates the automatic processing of the mailpiece during a subsequent sorting and transportation procedure based on the address information.

If the method is configured in such a way that not only the customer generates recipient address data but also so that external components transmit specific recipient addresses to the storage means that is connected to the device, this enhances the flexibility of the method and the benefit to the customer.

If the device according to the invention is integrated into an electronic parcel deposit box facility, the advantages of flexible use of a parcel deposit box facility can be augmented by additional advantages. The customer has access to a device with which he can perform all of the requisite transactions for the acceptance and sending of mailpieces. In particular, he can generate and purchase postage payment labels that he applies onto mailpieces that he then places into a compartment of the parcel deposit box facility for pick-up by a logistics service provider.

BRIEF DESCRIPTION OF THE DRAWINGS

Additional advantages, special features and practical embodiments of the invention ensue from the subordinate claims and from the presentation below of preferred embodiments making reference to the figures.

The figures show the following.

DETAILED DESCRIPTION

Figure 3:
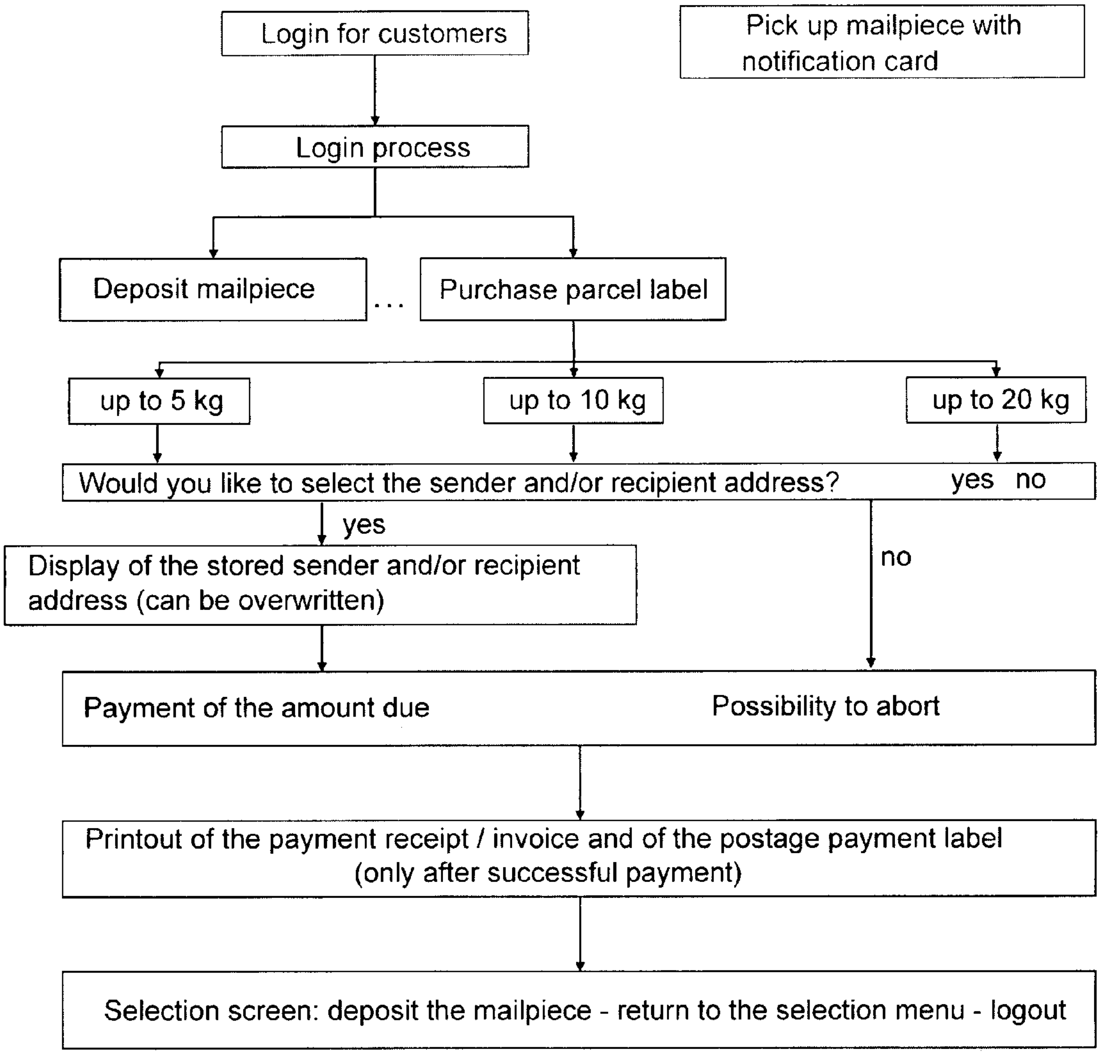
FIG. 3 an embodiment of the method according to the invention.

FIG. 3 shows an especially preferred embodiment of a device according to the invention, integrated into an electronic parcel deposit box facility 10. The parcel deposit box facility preferably has several lockable compartments that serve for depositing and removing mailpieces by a customer and/or deliverer. The facility can be used, for instance, for a customer 20 to deposit a mailpiece 130 into a compartment of the parcel deposit box facility from which it is then removed by a logistics service provider and conveyed to a recipient 30. Advantageously, this customer is a registered customer 20 of an overall system that comprises several parcel deposit box facilities at various locations so that the customer can deposit and remove mailpieces at various parcel deposit box facilities.

The control of the parcel deposit box facility involves specific means for performing various transactions at the parcel deposit box facility. In order to carry out the method according to the invention, the device has at least one storage means 60 that is connected to the parcel deposit box facility. The storage means is, for example, a database.

The storage means 60 can be situated locally in the parcel deposit box facility or at a location that is physically remote from it, whereby in the latter case, the storage means is connected to the device via a permanently or temporarily established line. Since preferably several parcel deposit box facilities are integrated into an overall system and it is advantageous to administer them centrally, it has proven to be practical to install storage means 60, for example, into a central data processing unit remote from the individual parcel deposit box facilities. Consequently, several parcel deposit box facilities have access to the data of the storage means, whereby the central data processing unit can have additional means such as, for example, a notification component for exchanging status messages with the users of the system. A notification component could, for example, transmit a message to a service provider indicating that a mailpiece has been deposited into a parcel deposit box facility and is ready for pick-up.

In the storage means 60, the data is advantageously structured in such a way that it can be retrieved for the specific requirements of the parcel deposit box facilities. In one embodiment of the invention, at least customer data 40 and several unique identification codes 120 are stored in the storage means. The customer data is preferably stored in a customer-related manner, while the identification codes can be stored so as to be associated with a specific facility. Thus, a parcel deposit box facility is given a certain identification grouping which can be accessed at this parcel deposit box facility for the assignment of postage payment labels. It is also possible to store identification codes without relating them to a specific parcel deposit box facility of the system so that all of the facilities can access a shared identification code grouping. In the case of an embodiment involving a local storage means in each parcel deposit box facility, preferably a certain identification code grouping is likewise assigned to each storage means.

The invention also encompasses an embodiment in which the storage means 60 is made up of two separate devices, so that one partial means centrally administers, for example, all of the customer and recipient data, while the other partial means is situated in a parcel deposit box facility and contains the identification codes specifically assigned to a facility.

The various items of address data in the storage means 60 can be generated in different ways. Advantageously, when a customer is registered in the overall system, his customer data 40 is recorded—preferably including the recording of the customer address in addition to other information—so that this data can be stored in a customer-related manner. The selection of recipient addresses 50 of a customer can be entered by the customer via an Internet application of the system and can be transmitted to the storage means 60 that is connected to the system. In this process, stored recipient profiles can advantageously be augmented, modified or deleted by the customer at any time. Moreover, recipient addresses can be generated by an external component 21 and transmitted to the storage means 60.

The parcel deposit box facility also has recorder 100 for recording the identification of a customer 20. The identification can involve, for example, customer cards (magnetic cards, RFID cards, etc.), codes, biometric methods or interaction means such as cell phones or other digital devices. Correspondingly, the recorder can be configured, for example, as card readers, keyboards or touchscreens by means of which the identity of a customer is recorded. The access rights of the customer are typically verified on the basis of the identification and, only if the identification is valid, is the customer granted access to functions of the device. In this manner, on the basis of the customer identification, customer data such as his address or the recipient addresses belonging to his profile can be associated with the customer.

The device also has display means 70 for displaying information to the customer 20 or to a logistics service provider. After a successful login by the customer, the display means preferably displays a function menu comprising, among other things, functions for purchasing a postage payment label. By selecting this menu option, the customer is taken to the procedure of the sale of a postage payment label, which can be effectuated on a personalized basis, depending on the association of his customer data.

The procedure of the purchase of a postage payment label by a customer can entail different degrees of personalization. Thus, for instance, the display can show the customer his address as the sender address to be printed on the postage payment label. The customer can also choose not to insert the displayed address, thus generating a blank postage payment label or else he can, for example, change the displayed address and then select it for printing. Moreover, the recipient profiles stored by the customer can be displayed for selection purposes. If a recipient address desired by the customer is not contained in the stored profiles, he can manually enter this address. In this context, it is advantageous that the customer can choose whether this new recipient address should be stored and likewise made available in the future.

In another embodiment of the invention, the selectable recipient profiles are augmented by address information from external components and systems. This information can be, for instance, data from an Internet auction website that is automatically transmitted to the storage means 60 after the customer has purchased an item. When the customer then goes to send the item, he has the correct recipient address available at a parcel deposit box facility so that he can immediately print it onto a postage payment label.

In order to print a postage payment label, an identification code 120 stored in the storage means 60 is assigned and associated with a postage payment label by a processor 80. In order to calculate the fee, the weight of the mailpiece is determined. The weight is specified, for example, through an entry by the customer. Here, he can preferably choose among several weight classes as is shown, for example, in the process sequence in FIG. 3. In another embodiment of the invention, the weight is determined by scales that are connected to the parcel deposit box facility. However, in an advantageous manner, this can only be carried out if a postage payment label is generated for a specific mailpiece which is then immediately deposited into the parcel deposit box facility for purposes of pick-up.

On the basis of the weight, the payment for the conveyance of a mailpiece with this weight can be calculated in the processor 80. In one embodiment of the invention, information from the recipient address enters into the calculation so that, for example, transportation to a domestic or foreign destination can be taken into consideration. The payment to be made is displayed to the customer on the display means 70, after which a payment procedure can be carried out at the device. The postage payment label can be paid for in various ways. For example, the amount can be debited from the balance of the customer's account. Other possibilities include known systems such as inserting cash or payment using a card.

Figure 1:
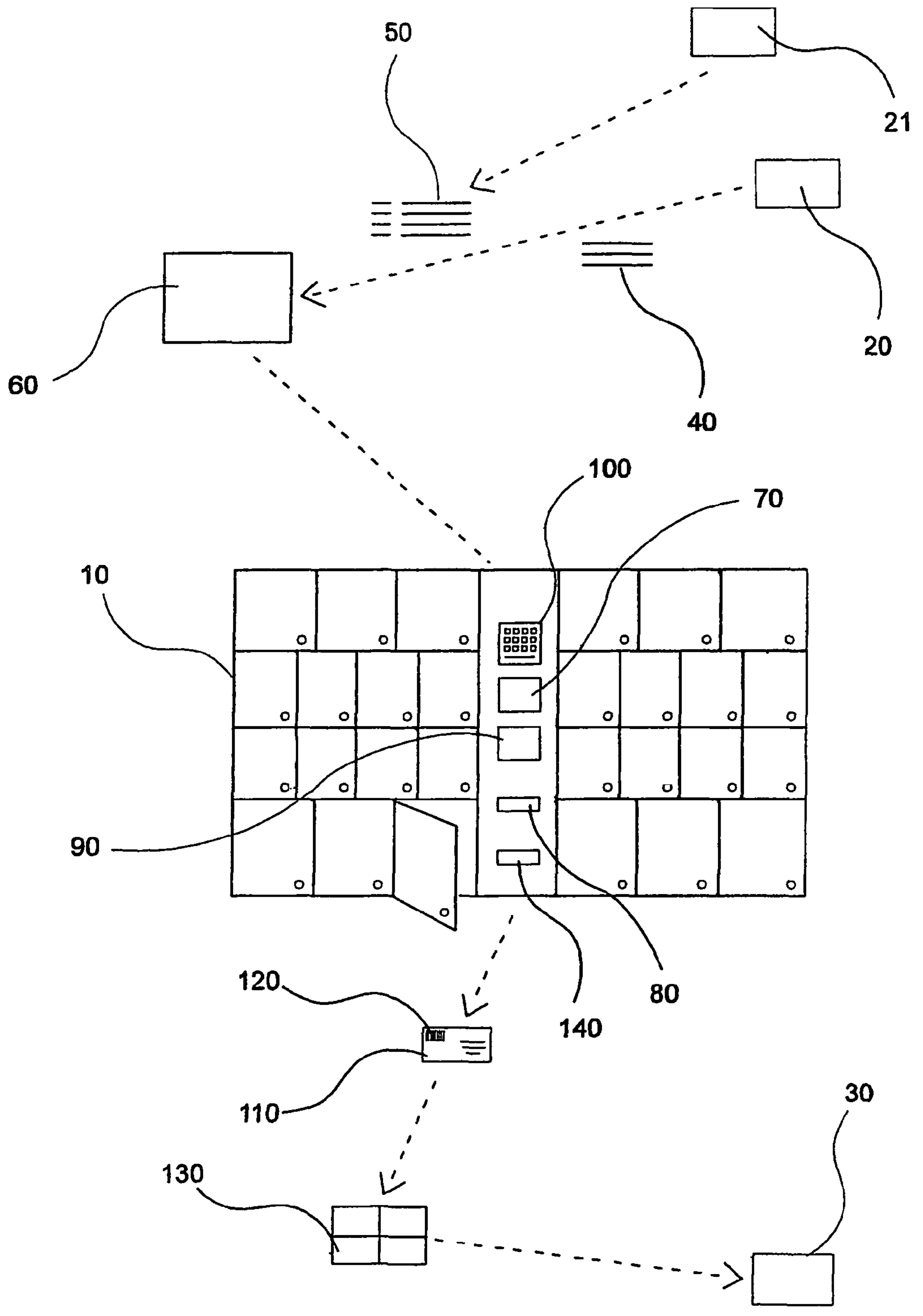
FIG. 1 an especially preferred embodiment of the device according to the invention, integrated into an electronic parcel deposit box facility.
Figure 2:
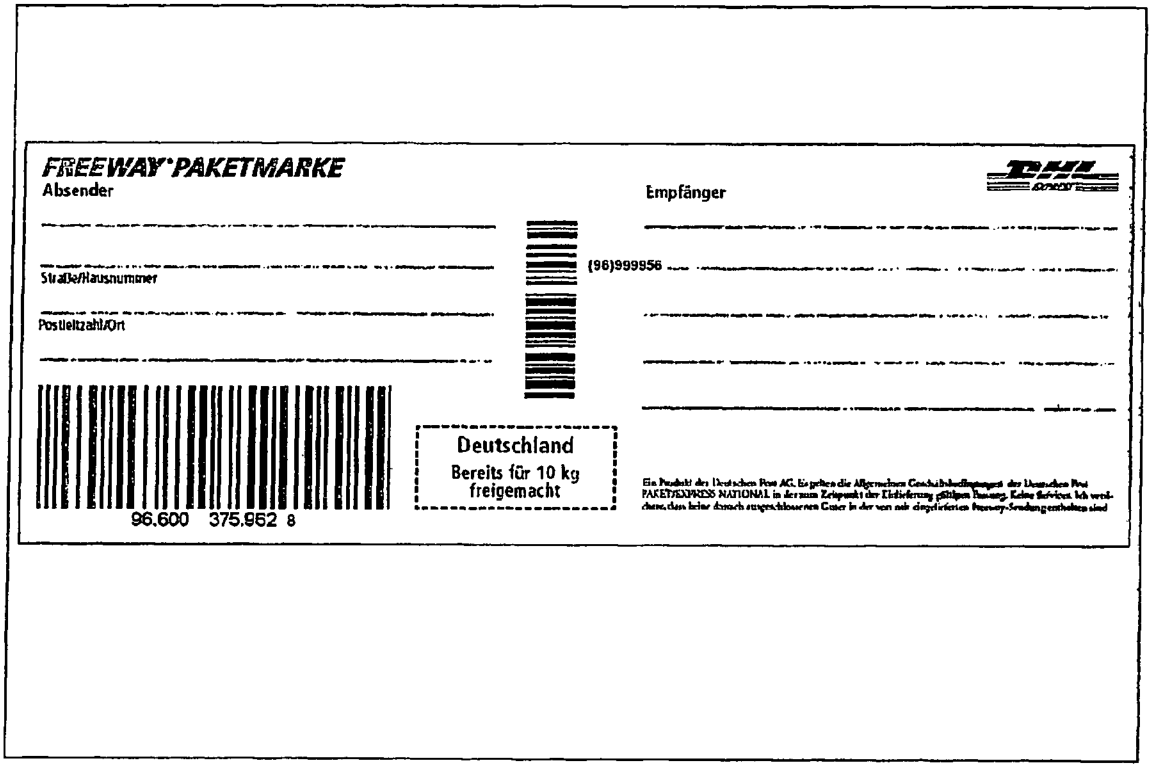
FIG. 2 an embodiment of a postage payment label generated using the method according to the invention.

The identification code, together with the optionally selected address information, is printed onto the postage payment label in a printer 140 and the postage payment label is issued. An especially preferred embodiment of a postage payment label can be seen in FIG. 2. In addition to the postage payment label, preferably a receipt is generated for the customer. In addition to the identification code and the address data, the postage payment label preferably also comprises information indicating that the payment for the label has already been made. Moreover, information can also be included about the service provider to whom the fee for conveyance has been paid. In a known manner, the postage payment label preferably has an adhesive layer on the back and can thus be applied onto mailpieces of the weight class for which payment has been made.

Mailpieces provided with a postage payment label are preferably deposited into a parcel deposit box facility for pick-up by a service provider, but the postage payment labels can also be used for the conventional shipping of parcels at a post office branch. The shipment via a parcel deposit box facility, however, offers the possibility of an effective payment assurance so that it can be practical to limit the shipments to the modality of depositing mailpieces into a parcel deposit box facility. Nevertheless, it can also be possible that, even when a parcel is handed in at a post office branch, for example, a preliminary scan at the counter is used to determine whether the identification code present is valid or not. Once this has been done, the system of code-based payment assurance can be realized independent of the drop-off modality. The prerequisite for this is that this form of payment assurance is only carried out in the case of mailpieces whose labels are printed out in the device of the type described in the invention, so that an immediate matching of identification code and status display (validity of the identification code) can be undertaken in the storage means.

The identification code 120 in the storage means 60 is characterized by at least two status displays, the first status display 1 indicating that a postage payment label 110 with this identification code has been printed out. The second status display 2 indicates that no postage payment label with this identification code has been printed out. If the identification codes are assigned centrally, then another status display can indicate, for example, the fact that an identification code was assigned and for which parcel deposit box facility it was assigned.

The status display of an identification code is advantageously set to 2 at the beginning of the process, since no identification code has been assigned yet. The status is set to 1 after the device has issued a postage payment label with the specific identification code. Preferably, a method for accepting mailpieces with postage payment labels is then carried out in such a way that the status display of an identification code is set back to 2, as soon as it has been recorded in conjunction with a mailpiece to be deposited into a parcel deposit box facility or via some other drop-off modality. This means that a paid postage payment label for conveying a mailpiece has been used and the assigned identification code can be assigned once again, whereby this is done either immediately or else after a latency period that can be defined at will.

The status display can be used to carry out a payment assurance in that the status display of the recorded identification code is checked before a mailpiece is deposited. In this context, only mailpieces with identification codes having the status display 1 are accepted, thus ensuring that the postage payment labels are indeed labels that have been sold and not used yet.

LIST OF REFERENCE NUMERALS

10 device/parcel deposit box facility
20 customer
21 external component
30 -recipient
40 customer data
50 recipient address data
60 storage means
70 display
80 processor
90 payment means
100 recorder
110 postage payment label
120 identification code
130 mailpiece
140 printer

The invention claimed is:

1. A method for generating and selling postage payment labels at an electronic parcel deposit box facility that has at least one lockable compartment for depositing and removing a mailpiece, whereby the postage payment labels can be used for sending mailpieces from a customer to a recipient, the method comprising:

the electronic parcel deposit box facility storing customer data of a customer in storage means that-is connected to a the electronic parcel deposit box facility, whereby the customer data contain at least the address of the customer;

the electronic parcel deposit box facility storing several unique identification codes in the storage means;

the electronic parcel deposit box facility storing recipient address data that are associated with the customer in the storage means, whereby the recipient address data are generated by an Internet auction website, associated with the customer, and transmitted to the storage means;

the electronic parcel deposit box facility recording the identification of the customer in a recorder;

the electronic parcel deposit box facility associating customer data with the customer on the basis of the identification by a processor that is connected to the electronic parcel deposit box facility;

the electronic parcel deposit box facility displaying the address of the customer on a display of the electronic parcel deposit box facility for purposes of one of selection and modification by the customer;

the electronic parcel deposit box facility displaying the recipient address data that are associated with the customer who is recorded at the electronic parcel deposit box facility on the display for purposes of one of selection and modification by the customer;

determining the weight of the mailpiece;

the electronic parcel deposit box facility assigning an identification code from the storage means and assigning the identification code with a postage payment label by the processor;

the electronic parcel deposit box facility calculating the payment for the shipment of the mailpiece by the processor and displaying the payment to be made on the display;

paying for the postage payment label at payment means of the electronic parcel deposit box facility;

the electronic parcel deposit box facility printing a postage payment label in a printer, whereby the postage payment label contains at least the assigned identification code, the address of the customer, and a recipient address;

the electronic parcel deposit box facility allowing the deposition of the mailpiece into the electronic parcel deposit box facility;

associating, by the processor, the identification code with one of two status identifiers in the storage means, the first status identifier indicating that a postage payment label has been printed with the identification code and the second status identifier indicating that no postage payment label has been printed with the identification code, comprising setting the status identifier in the storage means to the second status identifier at the beginning of the process and to the first status identifier after the electronic parcel deposit box facility has issued a postage payment label with the identification code, the storage means changing the status identifier to the second status identifier as soon as the mailpiece has been deposited into the parcel deposit box, and carrying out a payment assurance by the electronic parcel deposit box facility using the status identifiers before allowing the deposition of the mailpiece.

2. The method according to claim 1, comprising generating and issuing a receipt for the sold postage payment label.

3. The method according to claim 1, comprising specifying the weight of the mailpiece through an entry by the customer.

4. The method according to claim 1, comprising determining the weight of a mailpiece by placing a mailpiece onto a set of scales that is connected to the electronic parcel deposit box facility.

5. An electronic parcel deposit box facility having at least one lockable compartment for depositing and removing mailpieces, the electronic parcel deposit box facility generating and selling postage payment labels, whereby the postage payment labels can be used to send mailpieces from a customer to a recipient, the device being an electronic parcel deposit box facility having at least one lockable compartment for depositing and removing mailpieces, the electronic parcel deposit box facility comprising:

a database connected to the device for storing one of customer data and recipient address data associated with the customer and for storing several unique identification codes;

a recorder recording the identification of a customer;

a display displaying the customer address and at least one recipient address to the customer;

an internet application selecting the customer address and a recipient address;

a scale determining the weight of the mailpiece;

a processor that serves to receive recipient address data associated with a customer from an Internet auction website, to associate customer data with the recorded customer, to calculate a payment for the shipment of the mailpiece on the basis of the determined weight, to effectuate the payment for a postage payment label, for assigning the identification code from the database and for associating the customer address and a recipient address with the postage payment label; and a printer printing the postage payment label with the identification code, the customer address and the recipient address, wherein the identification code is associated with one of two status identifiers in the database, the first status identifier indicating that a postage payment label has been printed with the identification code and the second status identifier indicating that no postage payment label has been printed with the identification code, wherein the status identifier in the database is set to the second status identifier at the beginning of the process and set to the first status identifier after the electronic parcel deposit box facility has issued a postage payment label with the identification code, the database changing the status identifier to the second status identifier as soon as the mailpiece has been deposited into the parcel deposit box, and wherein a payment assurance is determined by using the status identifiers before the deposition of the mailpiece is allowed into at least one lockable compartment.

6. The electronic parcel deposit box facility according to claim 5, wherein the database is situated in the electronic parcel deposit box facility.

7. The electronic parcel deposit box facility according to claim 5, wherein the database is situated at a location that is physically remote from the electronic parcel deposit box facility and is connected to the electronic parcel deposit box facility permanently or temporarily.

8. The electronic parcel deposit box facility according to claim 5, wherein the database comprises several parts, whereby all of the customer and recipient data are stored in a central partial means, while the identification codes assigned to the electronic parcel deposit box facility are stored in a local partial means.

9. The method of claim 1, wherein the mailpiece is allowed to be deposited into the compartment if the status identifier indicates that the postage payment label including the identification code has been printed.

* * * * *